(12) United States Patent
Pines

(10) Patent No.: US 8,330,297 B2
(45) Date of Patent: Dec. 11, 2012

(54) UPS SYSTEM

(75) Inventor: Avi Pines, Tel Aviv (IL)

(73) Assignee: Aviem Systems Ltd, Netanya (IL)

( * ) Notice: Subject to any disclaimer, the term of this patent is extended or adjusted under 35 U.S.C. 154(b) by 642 days.

(21) Appl. No.: 11/989,864

(22) PCT Filed: Aug. 2, 2006

(86) PCT No.: PCT/IL2006/000891
§ 371 (c)(1),
(2), (4) Date: Feb. 1, 2008

(87) PCT Pub. No.: WO2007/015242
PCT Pub. Date: Feb. 8, 2007

(65) Prior Publication Data
US 2010/0156187 A1 Jun. 24, 2010

Related U.S. Application Data

(60) Provisional application No. 60/705,194, filed on Aug. 4, 2005.

(30) Foreign Application Priority Data

Aug. 4, 2005 (IL) .......................................... 170118

(51) Int. Cl.
*H02J 1/00* (2006.01)
*H02J 3/00* (2006.01)
(52) U.S. Cl. ................. 307/75; 307/18; 307/64; 307/65
(58) Field of Classification Search .................... 307/18, 307/64, 65
See application file for complete search history.

(56) References Cited

U.S. PATENT DOCUMENTS 5,625,546 A 4/1997 Schaal
(Continued)

FOREIGN PATENT DOCUMENTS

EP 0 150 853 A2 8/1985
(Continued)

OTHER PUBLICATIONS

XP000010399: Muller, K.,"Reliability of UPS Configurations", Institute and Electronics Engineers, *Proceedings of the International Telecom Energy Conference (INTELEC)*, vol. 9, pp. 677-682, (Jun. 14, 1987).

(Continued)

*Primary Examiner* — Rexford Barnie
*Assistant Examiner* — Justen Fauth
(74) *Attorney, Agent, or Firm* — Vorys, Sater, Seymour and Pease LLP; Susanne M. Hopkins; William L. Klima

(57) ABSTRACT

There is provided a system for supplying power to a site having a load. The system comprises a number n of power source units, the value of n being greater than or equal to 3. The system further comprises a number $t \leq t_{max}$ of loads groups, each load group having a number i of inputs. The value of i is greater than or equal to 2 and less than the value of n. Each load group receives power from i power source units, such that each load group is connected to a unique combination of i power source units. $t_{max}$ is such that every possible combination of i power source units is connected to a unique load group.

22 Claims, 3 Drawing Sheets

U.S. PATENT DOCUMENTS

| | | | |
|---|---|---|---|
| 6,018,204 A * | 1/2000 | Kuruma | 307/64 |
| 6,433,444 B1 * | 8/2002 | de Vries | 307/64 |
| 6,728,601 B2 * | 4/2004 | Garcia et al. | 700/286 |
| 2001/0019226 A1 * | 9/2001 | Ekelund et al. | 307/29 |
| 2003/0076053 A1 * | 4/2003 | Kambara et al. | 315/224 |
| 2005/0071092 A1 | 3/2005 | Farkas et al. | |
| 2006/0017329 A1 * | 1/2006 | Brault | 307/151 |

FOREIGN PATENT DOCUMENTS

| | | |
|---|---|---|
| EP | 0685917 A1 | 12/1995 |
| EP | 1 220 434 A2 | 7/2002 |
| FR | 2 638 910 A1 | 5/1990 |
| FR | 2 685 830 A1 | 7/1993 |

OTHER PUBLICATIONS

XP-000858797: Thorsell, L., "Mini dc/dc supplies simplify redundancy in parallel systems", EDN Electrical Design News, *Reed Business Information*, Highlands Ranch, vol. 33, No. 9, pp. 225-231, (Apr. 28, 1998).

Communication pursuant to Rule 114(2) EPC, mailed May 2, 2012, 65 pages.

* cited by examiner

UPS SYSTEM

FIELD OF THE INVENTION

This invention relates to systems for supplying power from multiple uninterrupted power supplies.

BACKGROUND OF THE INVENTION

For a site having high load, that is, a variety of electronic devices which consume power, a system of high capacity uninterrupted power supplies (UPSs) is typically employed to ensure that even in the event of an external power failure, uptime is ensured. Configurations for these systems may provide redundancy, so that in the event of a single UPS failure, full power may still be provided to the site. This is referred to as an N+1 system.

One such common configuration is a parallel redundant configuration. Several UPSs are connected in parallel to a single bus. Under normal conditions, all the UPS outputs work in parallel and share the load equally to supply the required power to the load. In the event of a failure of a single UPS, the remaining UPSs can supply the required load. In this configuration, the number of UPSs used is the total number needed to supply power to the site, plus one more. The UPSs are equipped with internal static bypass switches (SBS), which transfer the load to direct mains feed if the UPSs cannot supply the load (e.g., in the event of multiple faults, overload, etc.). The SBS inputs are fed from utility power transformers. According to this type of configuration, if the load exceeds the power which is supplied by a single utility power transformer, a complex arrangement of transformers and UPSs may be implemented in order to circumvent problems inherent with connecting mains power from several transformers to a single bus via the internal SBSs. More commonly, several groups of UPSs are each arranged in parallel. Each group is connected to a single transformer and a unique bus. According to this arrangement, in order to provide N+1 redundancy to the entire site, an additional UPS must be provided to each group of UPSs.

SUMMARY OF THE INVENTION

It is one object of the present invention to provide an N+1 redundant system to provide power to a site, using the minimal number of UPSs.

According to a first aspect of the present invention, there is provided a system for supplying power. The system comprises a number n of power source units, which may be uninterrupted power supply (UPS) units, and a number t of loads groups, t being less than or equal to $t_{max}$, each load group having a number i of inputs. The value of i is greater than or equal to 2 and less than the value of n. The value of n is greater than or equal to 3. Each load group receives power from i power source units, such that each load group is connected to a unique combination of i power source units, and $t_{max}$ is such that every possible combination of i power source units is connected to a unique load group. According to one embodiment, $t = t_{max}$.

$t_{max}$ is given by:

$$t_{max} = \frac{n!}{(n-i)!i!}.$$

It will be understood that the x! notation represents the factorial function, which may be expressed as $$x! = \prod_{k=1}^{x} k$$

for all $x \geq 0$. For example, $4! = 4 \times 3 \times 2 \times 1$.

According to another embodiment, each load group has 2 inputs (i=2).

According to a further embodiment, the system is adapted to provide N+X redundancy. The number n of power source units is at least X more than would be required to supply, without redundancy, power to the site (i.e., X power source units may fail without any degradation of power supply to the site). In addition, the number i of inputs is greater than X. This ensures that in the event of failures in X power source units, each load group is still connected to at least one functioning power source unit. The maximum power output of each power source unit may be the same.

According to still further embodiments, the load groups are static transfer switches or power supplies with multiple inputs, or combinations thereof. It is not necessary that all load groups are of the same type.

According to another aspect of the present invention, there is a provided a method for constructing a system for supplying power to a site having a load. The method comprises the steps of:

(a) providing a number n of power source units, which may be UPSs, where n is a number greater than 2;

(b) providing a number t of load groups, each of said load groups adapted to receive power via a first input and a second input, the number t being given by $$t = \frac{n(n-1)}{2};$$

(c) connecting upstream sides of n−1 feed lines to power outputs of a first power source unit;

(d) connecting downstream sides of all of the feed lines whose upstream sides are connected to the first power source unit to the first input of each of n−1 load groups;

(e) connecting upstream sides of n−1 feed lines to power outputs of a subsequent power source unit;

(f) selecting a set of selected load groups, the number of selected load groups in said set being equal to the number of heretofore connected power source units, each of said selected load groups having been connected to a single power source unit, wherein no two selected load groups are connected to the same UPS;

(g) connecting a downstream side of a feed line from the subsequent power source unit to the second input of each of said selected load groups;

(h) connecting downstream sides of remaining feed lines whose upstream sides are connected to the subsequent power source unit to first inputs of load groups having two inputs which are free of any connection to a power source unit;

(i) selecting a different subsequent power source unit; and (j) repeating steps (e) through (i) until all power source units are connected.

The number n of UPSs is selected to be at least one more than necessary to supply the total power required by the site. The maximum power output of each UPS unit is the same.

The load groups may be static transfer switches or power supplies with multiple inputs, or combinations thereof. It is not necessary that all load groups are of the same type.

According to the various aspects of the present invention, the power source units may be connected to different transformers. This is particularly advantageous, since in the event that the power requirements of a site exceed that which is supplied by a single transformer, the different power supply units may still be arranged according to the present invention, without the complications normally associated with a parallel redundant system, as described above. An additional advantage is that the power outputs of the UPSs are not connected directly to each other. This eliminates common failure points, such as a short on a bus, common paths, etc, and associated cascade problems. The UPSs can be physically separated, which helps to localize any damage which may occur to a single UPS in the case of a catastrophic failure. An additional advantage is that all control connections among the UPSs and/or central control logic required by other methods, such as the parallel redundant system described above, are eliminated, resulting in improved overall system reliability and resilience to failures.

According to a further aspect of the present invention, there is provided a method of adding a power supply unit to a system designed according to the first aspect of the present invention, in particular when $t=t_{max}$ (i.e., every possible combination of i power source units is connected to a unique load group). The method comprises the steps of:
 (a) providing one additional power supply unit, which may be a UPS, and one additional load group, which may be a static transfer switch or a power supply having multiple inputs, or a combination thereof;
 (b) disconnecting from each one of a number z of power supply units one existing load group, wherein no existing load groups has more than one connection disconnected, said power supply units being disconnected power supply units and said load groups being disconnected load groups;
 (c) connecting each disconnected power supply unit to the additional load group;
 (d) connecting the additional power supply unit to the disconnected load groups; and
 (e) connecting the additional power supply unit to the additional load group.

The number z may be equal to 1, or to any number up to i−1.

According to this aspect, a system for supplying power according to the various other aspects of the present invention may be upgraded to comprise an additional power supply unit with minimal effort and complication.

BRIEF DESCRIPTION OF THE DRAWINGS

In order to understand the invention and to see how it may be carried out in practice, embodiments will now be described, by way of non-limiting examples only, with reference to the accompanying drawings, in which.

It will be noted that intersections of lines the drawings do not indicate connections of wires.

DETAILED DESCRIPTION OF EXEMPLARY EMBODIMENTS

According to the one embodiment of the present invention, there is provided a system for supplying a load to a site via a plurality of uninterrupted power supplies (UPSs), each adapted to supply electricity to any number of targets. The power supplied by the UPSs is distributed among a plurality of load groups. The load groups may be power supplies with multiple inputs known per se in the art. Each load group has a number of inputs. Each input is adapted to receive electricity from a single source. Feed lines are connected to the UPSs and the inputs to supply power to the load groups. Each UPS may be connected to any number of feed lines.

In order to determine the number of UPSs, each of a given power rating, required to supply power to a site with N+1 redundancy (i.e., where one UPS may fail without causing any disturbance to the site) for a given load, the following formula is used:

$$n = \left\lceil \frac{L_{site}}{P} \right\rceil + 1 \tag{1}$$

where:
  $\lceil x \rceil$ is a ceiling function, equal to the smallest integer which is greater than or equal to x;
  $L_{site}$ is the total load of the site; and
  P is the power rating of each UPS, where all UPSs have the same power rating. It will be appreciated that although according to the present embodiment all UPSs have the same rating, the UPSs may have different ratings, provided that all are equal to or exceed P.

It will be understood that in order for the results of formula 1 to be meaningful, the units of power in which L and P are expressed should be the to same (i.e., both in kVA, both in kW, etc.).

In order to determine the number of load groups necessary, the following formula is used:

$$t = \binom{n}{i} = \frac{n!}{(n-i)!\, i!} \tag{2}$$

where:
  t is the total number of load groups;
  n is the total number of UPSs; and
  i is the total number of inputs for each load group.

Figure 1:
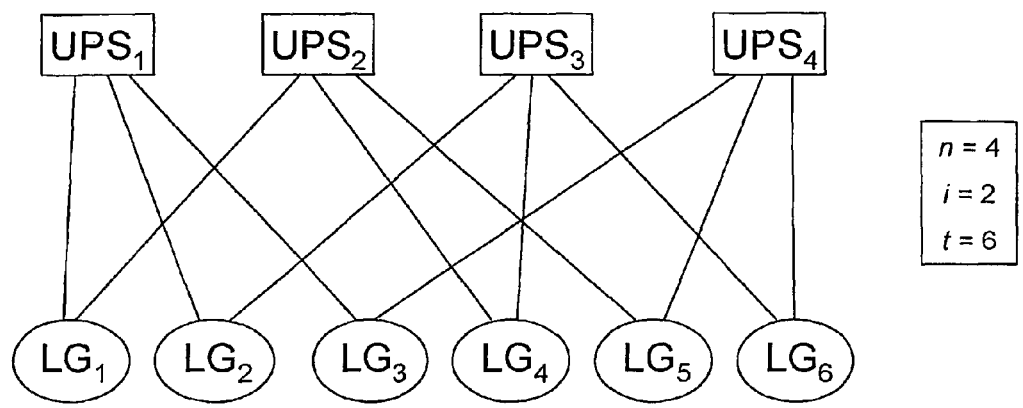
FIGS. 1 and 2 are schematic representation showing system configurations according to embodiments of the present invention.
Figure 2:
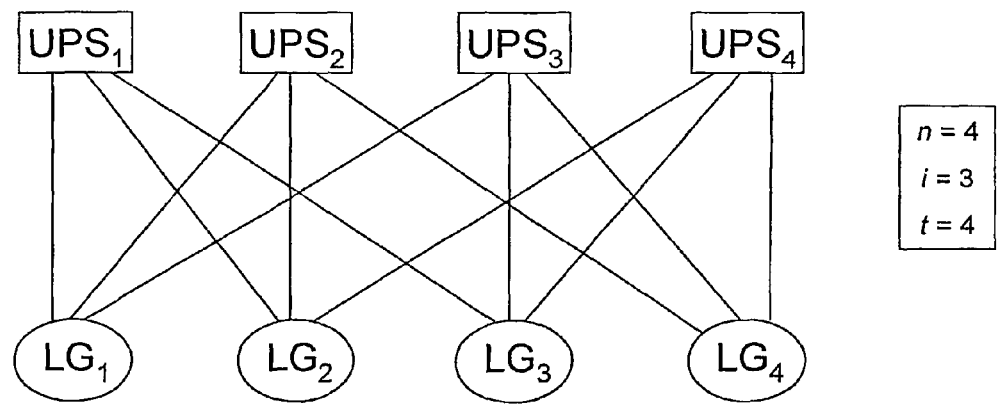

The UPSs are connected to the load groups such that each load group receives power from a combination of i UPSs. (It will be appreciated that within each load group, each input thereof receives power from a unique UPS.) Each combination of i UPSs is unique to one load group. Therefore, from formula 2, every possible combination of i UPSs is connected to exactly one load group. Examples of such arrangements are illustrated in FIGS. 1 and 2. The UPSs and load groups are connected in such a way as to create a system such that if one of the UPSs should fail, the remaining UPSs can compensate the load groups so that the site does not experience even a partial power loss. In order for this to be accomplished, the UPSs must supply power under normal conditions (i.e., with all UPSs functioning normally) as described below.

In order to determine the power to be supplied by each UPS under normal conditions, it will be assumed that each load group receives an equal power supply from each UPS. As the system described above has symmetry in that the UPSs and load groups can be arbitrarily renumbered without changing the system, this is a valid assumption. The number of feed lines connected to each UPS can be determined by dividing the total number of input feeds of all of the load groups by the number of UPSs. The total number of input feeds of all of the load groups is given by t×i, which is expressed fully as:

$$\frac{n!}{(n-i)!i!} \times i = \frac{n!}{(n-i)!(i-1)!} \quad (3)$$

Dividing by the number of UPSs n gives the number of feed lines connected to each UPS:

$$\frac{n!}{(n-i)!(i-1)!n} = \frac{(n-1)!}{(n-i)!(i-1)!} \quad (4)$$

Since no load group is connected to the same UPS by more than one input, formula 4 also gives the number of load groups connected to each UPS.

It will be appreciated that, ideally, in the event of a single UPS failure, the remaining UPSs should increase their power to their maximum capacities in order to compensate each load group attached to the failed UPS. Therefore, under normal operating conditions, each UPS must supply power at a rate lower than its maximum rating. This lower rate is found by realizing that for an N+1 system, the total power supplied in the case of a single UPS failure (i.e., by n−1 UPSs) must be equal to the total power, supplied under normal conditions. Dividing this value by the number of UPSs operating under normal conditions (i.e., n) gives the output of each UPS under normal conditions:

$$\frac{P(n-1)}{n} \quad (5)$$

The power supplied to each feed line, and hence, each input under normal conditions is found by dividing the output of each UPS under normal conditions by the number of feed lines connected to each UPS (i.e., dividing formula 5 by formula 4). While cumbersome, this can be written out fully and simplified to give:

$$\frac{P}{n} \times \frac{(n-i)!(i-1)!}{(n-2)!} \quad (6)$$

The power supplied to each load group, indicated by g, is found by multiplying the result of formula 6 by the number of inputs to each load group. This can be simplified to give:

$$g = \frac{P}{n} \times \frac{(n-i)!i!}{(n-2)!} \quad (7)$$

The above results can be verified by calculating the total capacity C available to the site (this should not be confused with $L_{site}$, which represents the required load, not the amount actually supplied by the UPSs and available for use). This can be determined directly by multiplying the output of each UPS under normal conditions (using formula 5) by the number of UPS, which can be expressed as P(n−1). This can also be found by multiplying the number of load groups as given in formula 2 by the power supplied to each load group in formula 7, as follows:

$$C = \frac{P}{n} \times \frac{(n-i)!i!}{(n-2)!} \times \frac{n!}{(n-i)!i!} = P(n-1) \quad (8)$$

In the event of a single UPS failure, the load groups which received power from the failed UPS become affected load groups. Each of the remaining UPSs will increase their power output to the affected load groups. The amount of power by which each remaining UPS must increase can be found by dividing the power output by the failed UPS before the failure by the number of remaining UPSs. This can be expressed as:

$$\frac{P(n-1)}{n} \times \frac{1}{(n-1)} = \frac{P}{n} \quad (9)$$

Since the power output of each remaining UPS increases by the amount indicated in formula 9, the total amount of power output by each remaining UPS in the case of a single power failure is:

$$\frac{P(n-1)}{n} + \frac{P}{n} = P \quad (10)$$

Formulas 9 and 10 demonstrates that when a single UPS experiences a failure, all other UPSs compensate by supplying power at their maximum ratings. This N+1 redundancy system is therefore optimal, since reducing either the number of UPSs or the ratings thereof will result in supplying the site with less power than required.

A "utilization factor" of the system, $\eta_{system}$, can be expressed as the ratio of the total load used by the load groups to the maximum combined capacity of the UPSs as follows:

$$\eta_{system} = \frac{g \times t}{P \times n} \quad (11)$$

Since the total power supplied to all of the load groups is equivalent to the total power supplied to the site L, it can be expressed (from formula 8) as:

$$g \times t = P(n-1) \quad (12)$$

The utilization factor of the system can be simplified as follows:

$$\eta_{system} = \frac{P(n-1)}{P \times n} = \frac{n-1}{n} \quad (13)$$

During normal operating condition, each UPS supplies a percentage of its total capacity, the percentage being given by the utilization factor. This can be expressed as:

$$P \times \eta_{system} = \frac{P(n-1)}{n} \quad (14)$$

This result was expected from formula 5.

The above embodiment may be adapted to provide N+X redundancy to a system for any value of X. In order to accomplish this, i must be greater than or equal to X+1. In addition, formulas 1, 5, 6, and 7 are generalized to give the number of required UPSs (formula 1A), the output of each UPS under normal conditions (formula 5A), the number of feed lines from each UPS (formula 6A), and the power supplied to each load group (formula 7A), as follows:

$$n = \left\lceil \frac{L_{site}}{P} \right\rceil + X \quad (1A)$$

$$\frac{P(n-X)}{n} \quad (5A)$$

$$\frac{P(n-X)(n-i)!(i-1)!}{n!} \quad (6A)$$

$$g = \frac{P(n-X)(n-i)!i!}{n!} \quad (7A)$$

The utilization factor for an N+X system is expressed as:

$$\eta_{system} = \frac{n-X}{n} \quad (13A)$$

FIG. 2 illustrates a system which may be utilized to provide either N+1 or N+2 redundancy. To provide N+1 redundancy, each UPS should supply power at 75% of its capacity (25% to each feed line) under normal conditions. To provide N+2 redundancy, each UPS should supply power at 50% of its capacity (16⅔% to each feed line) under normal conditions.

Although the above method may be used to provide power to load groups having any number of inputs, it is very common to use load groups having two inputs. Therefore, a specific non-limiting example will now be presented in order to demonstrate how the above described method can be utilized to construct a system.

A site requires a load of $L_{site}$=1.5 MVA (1500 kVA). Each UPS to be used has a maximum rating of P=500 kVA. Therefore, from formula 1, the number of UPSs to be used is n=4. Each load group is a power supply having i=2 inputs. The number of load groups required is given by formula 2, which for i=2 reduces to:

$$t = \frac{n!}{(n-2)!2!} = \frac{n(n-1)}{2} \quad (15)$$

In the present example, therefore, t has a value of 6. To determine the number of load groups connected to each UPS, we use formula 4, and reduce it for i=2, as follows:

$$\frac{(n-1)!}{(n-i)!(i-1)!} = \frac{(n-1)!}{(n-2)!(2-1)!} = n-1 \quad (16)$$

Each UPS is therefore connected to 3 load groups. Such an arrangement is illustrated in FIG. 1.

From formula 6, we determine that each feed line carries, under normal condition, 125 kVA, and each load group receives 250 kVA. Each UPS is supplying power at 75% capacity, that is, 375 kVA, to three load groups. In the event of a single UPS failure, each of the three affected load group would receive 125 kVA. To compensate, each remaining UPS increases power by 125 kVA (from formula 9) to full capacity, or 500 kVA. Since each remaining UPS is connected to one affected load group, the 125 kVA power increase in each UPS is supplied thereto. This compensation happens substantially instantaneously, so total power supplied to the site via the load groups is unaffected by the single UPS failure.

In general, we may map each UPS to its respective load groups by manually writing out all possible combinations of i UPSs, and assigning each combination to a load groups. For our example, the 6 possible combinations of picking 2 out of 4 UPSs is as follows (each load group (LG) and UPS is given a subscript for simplification):

| $LG_1$ | $LG_2$ | $LG_3$ | $LG_4$ | $LG_5$ | $LG_6$ |
|---|---|---|---|---|---|
| $UPS_1$ | $UPS_1$ | $UPS_1$ | $UPS_2$ | $UPS_2$ | $UPS_3$ |
| $UPS_2$ | $UPS_3$ | $UPS_4$ | $UPS_3$ | $UPS_4$ | $UPS_4$ |

For the specific example of 2 inputs per load group, this can be constructed by the following method:
1. $UPS_1$ is connected to the first n−1 load groups ($LG_1$, $LG_2$, $LG_3$);
2. $UPS_2$ is connected to the first load group to which $UPS_1$ is connected ($LG_1$), and then the remainder of its feeds are connected to the next load groups which are thus far totally free of any connections ($LG_4$, $LG_5$);
3. $UPS_3$ is connected to the first load group to which $UPS_1$ is alone connected ($LG_2$), the first load group to which $UPS_2$ is alone connected ($LG_4$), and the remaining feed is connected to a load group which is thus far free of any connections ($LG_6$); and
4. $UPS_4$ is connected to the first load group to which $UPS_1$ alone is connected ($LG_3$), the first load group to which $UPS_2$ alone is connected ($LG_5$), and the first load group to which $UPS_3$ is alone connected ($LG_6$).

It will be appreciated that the above method can be generalized for a system comprising any number of UPSs. Each UPS is connected to n−1 feed lines. Each feed line from a first UPS is connected to a different load group. Each subsequent UPS is connected so that first feed lines are connected to load groups which have already been connected to a different UPS, making sure that no load group is connected to the same two UPSs as any other. Once the maximum number of feed lines has been connected in this way, the remaining feed lines are connected to load groups which have heretofore not been connected to any UPS.

The above may also be used to provide partial coverage (as will be explained below) in the event of a failure of two UPSs. In order to provide this partial coverage, each of the UPSs must be oversized, that is, a UPS having a larger capacity, by a factor of 1/n, than described above. In such a case, if two UPSs fail, the load group which is connected to those failed UPSs cannot receive any power. However, the other load groups can be fully compensated. Thus, the site will be provided with partial coverage in the event of two UPSs failures.

An illustration of this partial coverage will be presented using the example given above. Each UPS has a capacity of 625 kVA (500 kVA plus an additional 25%). If $UPS_2$ and $UPS_4$ fail, then $LG_5$ cannot be instantaneously compensated, since it is not connected to any functioning UPSs. In addition, $LG_1$, $LG_3$, and $LG_6$, each of which is connected to exactly one of the failed UPSs, will each need to be compensated for 125 kVA, for a total of 500 kVA which is the load groups now require. Since each UPSs, under optimal conditions, supplies 375 kVA, they each increase their supply by 250 kVA, for a total increase to the site of 500 kVA, making up for the capacity caused by the failures of $UPS_2$ and $UPS_4$.

Figure 3A:
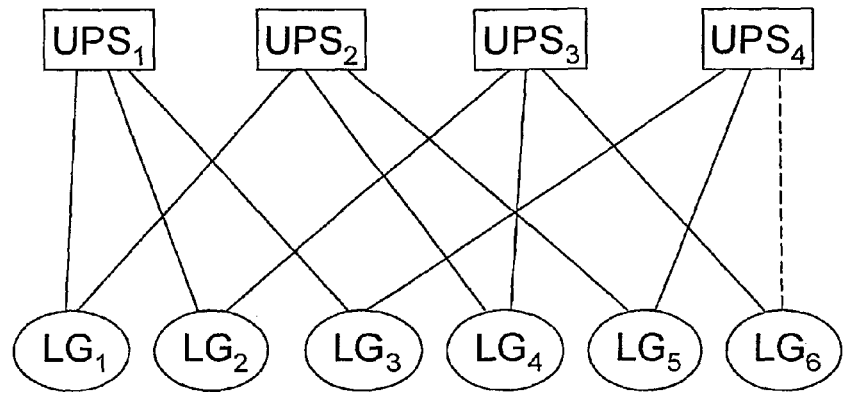
FIGS. 3A through 4B are schematic representations illustrating how a system designed according to the configuration illustrated in FIG. 1 may be expanded.
Figure 3B:
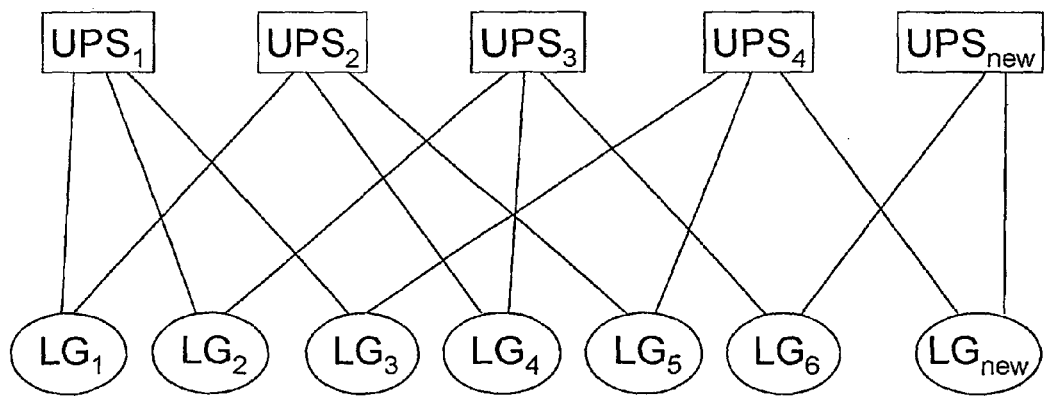

FIGS. 3A and 3B illustrate schematically how an additional UPS (indicated by $UPS_{new}$) and an additional load group (indicated by $LG_{new}$) may be added in a simplified manner, in an event when more capacity is required. One existing UPS ($UPS_4$ in this example) is disconnected from one existing load group ($LG_6$ in this example), as illustrated by the broken line in FIG. 3A. As illustrated in FIG. 3B, the new UPS is connected to the existing load group and to the new load group. In addition, the existing UPS is connected to the new load group. Each new feed line carries the same capacity as the existing feed line, which, in the example illustrated in FIGS. 3A and 3B, is P/4. The new UPS is only redundant with two of the existing UPSs, which, for the illustrated example, are $UPS_3$ and $UPS_4$. In addition, during normal operation it uses a lower percentage of its capacity as compared to the existing UPSs. While the new configuration does not provide all of the benefits of the configuration described above, such as full redundancy and optimal utilization of UPS capacity, its advantage resides in its simplicity to implement, requiring minimal impact on an existing system. The power rating of $UPS_{new}$ may be lower than the rating of the other UPSs without affecting the redundancy. In the example shown, the rating of $UPS_{new}$ would be 75% of the capacity of each existing UPS, and it supplies power at ⅔ (66.67%) its capacity under normal conditions.

Figure 4A:
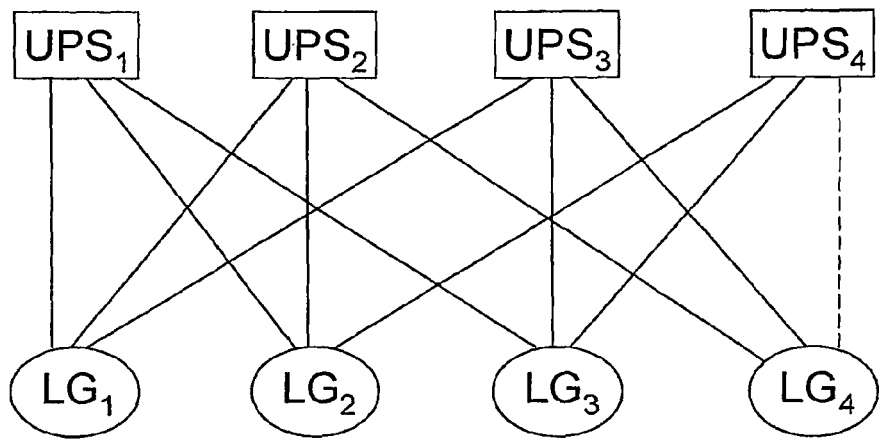
Figure 4B:
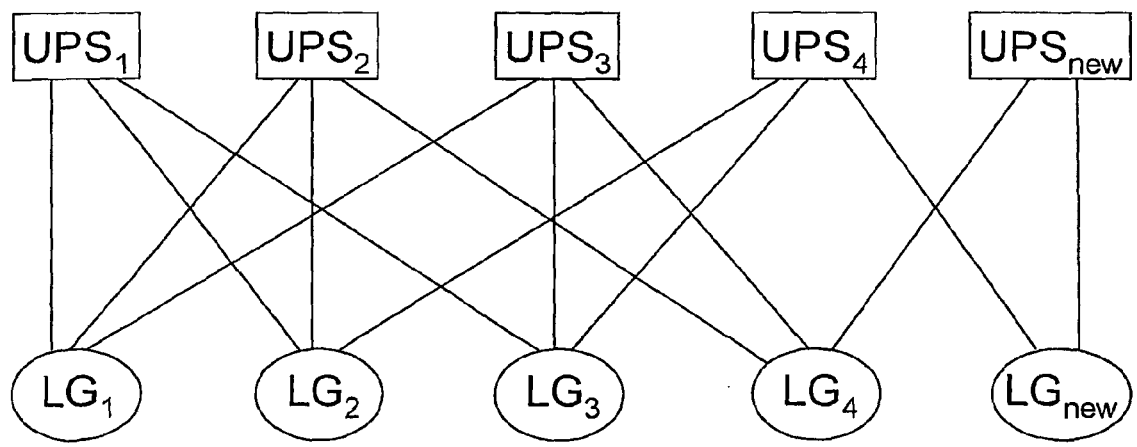

The method described above can be used to expand a system having load groups of any number of inputs by adding a new UPS and a new load group with two inputs. An example for i=3 is illustrated in FIGS. 4A and 4B.

It will be appreciated that the above described method is easily adaptable. For example, the new load group may have any number of inputs. In this case, it must be carefully considered which existing connections are disconnected in order to minimize the capacity required by the new UPS in order to ensure that the existing level of redundancy is maintained. It is also worthwhile to note that the power supplied directly to the new load group by the new UPS may be equal to, less than, or greater than that supplied in each existing feed line. In any case, the capacity of the new UPS must be considered carefully.

Those skilled in the art to which this invention pertains will readily appreciate that numerous changes, variations and modifications can be made without departing from the scope of the invention mutatis mutandis. For example, power supply units which supply AC power or DC power may be used. The DC power supply units may be DC UPSs, rectifiers, battery strings, solar panels, fuel cells, or any other source of DC power.

The invention claimed is:

1. A system for supplying power to a site having a load, the system comprising:
    (a) a number n of power source units, the value of n being greater than or equal to 3;
    (b) a number t of loads, each load having a number i of inputs, the value of i being greater than or equal to 2 and less than the value of n;
    wherein each load receives power from i power source units via i power input lines, at least one of the power source units provides power to one or more of the other loads, such that each load is simultaneously and permanently connected to a unique combination of i power source units, and t being such that every possible combination of power source units is connected to a unique load.

2. A system according to claim 1, wherein the power source units are chosen from the group comprising AC uninterrupted power supplies, DC uninterrupted power supplies, batteries, rectifiers, battery strings, solar panels, and fuel cells.

3. A system according to claim 1, wherein $$t = \frac{n!}{(n-i)! i!}.$$

4. A system according to claim 1, wherein the value of i is equal to 2.

5. A system according to claim 1, wherein the maximum power output of each UPS unit is the same.

6. A system according to claim 1, adapted to provide N+X redundancy, wherein the number n of power source units is at least X more than would be required to supply power to the site without redundancy, and the number i of inputs is greater than X.

7. A system according to claim 1, wherein at least some of the loads comprise power supplies with multiple inputs.

8. A system according to claim 1, wherein at least some of the loads comprise static transfer switches.

9. A method according to claim 1, wherein no load is disconnected from a unique combination of power source units.

10. A method for constructing a system for supplying power to a site having a load, the method comprising:
    (a) providing a number n of power source units, where n is a number greater than 2;
    (b) providing a number t of load groups, each of said loads adapted to receive power via a first input and a second input, the number t being given by $$t = \frac{n(n-1)}{2};$$

(c) connecting upstream sides of n−1 feed lines to power outputs of a first power source unit;
    (d) connecting downstream sides of all of the feed lines whose upstream sides are connected to the first power source unit to the first input of each of n−1 loads;
    (e) connecting upstream sides of n−1 feed lines to power outputs of a subsequent power source unit;
    (f) selecting a set of selected loads, the number of selected loads in said set being equal to the number of heretofore connected power source units, each of said selected loads having been connected to a single power source unit, wherein no two selected loads are connected to the same power source unit;
    (g) connecting a downstream side of a feed line from the subsequent power source unit to the second input of each of said selected loads groups;
    (h) connecting downstream sides of remaining feed lines whose upstream sides are connected to the subsequent power source unit to first inputs of loads having two inputs which are free of any connection to a power source unit; and
    (i) repeating steps (e) through (i) until all power source units are connected.
    (j) connecting upstream sides of n−1 feed lines to power outputs of the one non-connected power source unit; and
    (k) connecting downstream sides of the feed lines connected to the one non-connected power source unit to loads having been connected to a single power source unit.

11. A method according to claim 10, wherein the power source units are UPSs.

12. A method according to claim 10, wherein the number n of power source units is at least one more than necessary to supply the total power required by the site.

13. A method according to, claim 10, wherein the maximum power output of each power source unit is the same.

14. A method according to, claim 10, wherein at least some of the loads comprise power supplies with multiple inputs.

15. A method according to, claim 10, wherein at least some of the loads comprise static transfer switches.

16. A method of adding a power supply unit to a system, wherein the system is characterized in that it comprises a number n of power source units, the value of n being greater than or equal to 3; a number of loads groups, each load group having a number i of inputs, the value of i being greater than or equal to 2 and less than the value of n; each load group receives power from i power source units, such that each load group is connected to a unique combination of i power source units, and every possible combination of i power source units is connected to a unique load group; wherein the method comprises the steps of:
 a. providing one additional power supply unit and one additional load group;
 b. disconnecting from each one of a number z of power supply units one existing load group, wherein no existing load groups has more than one connection disconnected, said power supply units being disconnected power supply units and said load groups being disconnected load groups;
 c. connecting each disconnected power supply unit to the additional load group;
 d. connecting the additional power supply unit to the disconnected load groups; and
 e. connecting the additional power supply unit to the additional load group.

17. A method according to claim 16, wherein z is equal to 1.

18. A method according to claim 16, wherein z does not exceed or is equal to i−1.

19. A method according to, claim 16, wherein the capacity of the additional power supply unit is less than that of the existing power supply units.

20. A method according to, claim 16, wherein the power source units are UPSs.

21. A method according to claim 16, wherein the load groups comprise power supplies with multiple inputs.

22. A method according to, claim 16, wherein the load groups comprise static transfer switches.

* * * * *